US012769753B2

(12) United States Patent
Huang et al.

(10) Patent No.: US 12,769,753 B2
(45) Date of Patent: Oct. 20, 2026

(54) DATA QUERY METHOD AND APPARATUS, AND SECURE MULTI-PARTY DATABASE

(71) Applicant: Alipay (Hangzhou) Information Technology Co., Ltd., Hangzhou (CN)

(72) Inventors: Qunshan Huang, Hangzhou (CN); Shunde Cao, Hangzhou (CN); Yang Yang, Hangzhou (CN); Jun Qi, Hangzhou (CN); Lei Wang, Hangzhou (CN); Benyu Zhang, Palo Alto, CA (US); Pu Duan, Sunnyvale, CA (US); Jian Du, Hangzhou (CN); Qingkai Mao, Hangzhou (CN); Yang Zhao, Hangzhou (CN); Kefeng Yu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 189 days.

(21) Appl. No.: 18/571,868

(22) PCT Filed: Jul. 7, 2022

(86) PCT No.: PCT/CN2022/104422
§ 371 (c)(1),
(2) Date: Dec. 19, 2023

(87) PCT Pub. No.: WO2023/040432
PCT Pub. Date: Mar. 23, 2023

(65) Prior Publication Data

US 2024/0362243 A1 Oct. 31, 2024

(30) Foreign Application Priority Data

Sep. 18, 2021 (CN) .......................... 202111126949.2

(51) Int. Cl.
*G06F 16/25* (2019.01)
*G06F 16/23* (2019.01)
(Continued)

(52) U.S. Cl.
CPC .............. *G06F 16/25* (2019.01); *G06F 16/23* (2019.01); *G06F 16/2455* (2019.01); *G06F 16/248* (2019.01); *G06F 21/6245* (2013.01)

(58) Field of Classification Search
CPC ...... G06F 16/25; G06F 16/23; G06F 16/2455; G06F 16/248; G06F 21/6245
See application file for complete search history.

(56) References Cited

U.S. PATENT DOCUMENTS 7,181,017 B1 * 2/2007 Nagel ..................... H04L 9/302 380/282
8,365,276 B1 * 1/2013 Sallam ................ H04L 63/1416 713/189
(Continued)

FOREIGN PATENT DOCUMENTS

CN 111382174 A 7/2020
CN 112860738 A 5/2021
(Continued)

OTHER PUBLICATIONS

The International Search Report and Written Opinion of the International Searching Authority for International Application No. PCT/CN2022/104422 mailed on Sep. 30, 2022.

*Primary Examiner* — Mark E Hershley

(57) ABSTRACT

This specification provides a multi-party database including a central node and a plurality of databases. The central node has a disclosed first interface. Each of a plurality of query engines corresponding to the plurality of databases includes a second interface configured to interact with the first interface. The central node can determine a plurality of target databases related to a query request from the plurality
(Continued)

of databases based on the query request; and send a query indication to a plurality of target query engines corresponding to the plurality of target databases through the first interface. The plurality of target query engines can receive the query indication from second interfaces in the plurality of target query engines, and execute the query indication to obtain a query result; and send the query result to the first interface in the central node through the second interfaces.

18 Claims, 3 Drawing Sheets

(51) Int. Cl.

| | |
|---|---|
| ***G06F 16/2455*** | (2019.01) |
| ***G06F 16/248*** | (2019.01) |
| ***G06F 21/62*** | (2013.01) |

(56) References Cited

U.S. PATENT DOCUMENTS

| | | | | |
|---|---|---|---|---|
| 8,938,472 | B2 * | 1/2015 | Annapragada | G06F 16/90335 707/770 |
| 9,300,691 | B1 * | 3/2016 | Banerjee | H04L 41/0894 |
| 9,489,443 | B1 * | 11/2016 | Muniswamy-Reddy | G06F 16/27 |
| 11,062,215 | B2 * | 7/2021 | Laine | G06F 16/27 |
| 2008/0319958 | A1 * | 12/2008 | Bhattacharya | G06F 16/242 |
| 2012/0143922 | A1 * | 6/2012 | Rane | G06F 21/6245 707/E17.005 |
| 2012/0213359 | A1 * | 8/2012 | Troncoso Pastoriza | H04L 9/008 380/28 |
| 2016/0234251 | A1 * | 8/2016 | Boice | H04L 63/20 |
| 2016/0371356 | A1 * | 12/2016 | Lee | G06F 16/273 |
| 2017/0070351 | A1 * | 3/2017 | Yan | G06F 21/6245 |
| 2017/0177697 | A1 * | 6/2017 | Lee | G06F 1/14 |
| 2017/0177698 | A1 * | 6/2017 | Lee | G06F 16/275 |
| 2018/0039671 | A1 * | 2/2018 | Yang | G06F 16/278 |
| 2018/0218426 | A1 * | 8/2018 | Vaya | G06F 16/9577 |
| 2018/0349418 | A1 * | 12/2018 | Lee | G06F 11/1446 |
| 2018/0349430 | A1 * | 12/2018 | Lee | G06F 16/2365 |
| 2018/0375899 | A1 * | 12/2018 | Brett | G06F 16/22 |
| 2019/0333155 | A1 * | 10/2019 | Natesan Ramamurthy | G06N 20/00 |
| 2020/0126075 | A1 * | 4/2020 | Fisch | G06F 21/6245 |
| 2020/0358672 | A1 * | 11/2020 | Lange | H04L 41/5096 |
| 2021/0273784 | A1 * | 9/2021 | Gryb | H04L 9/085 |
| 2021/0286885 | A1 * | 9/2021 | Locher | G06F 21/602 |
| 2021/0303154 | A1 * | 9/2021 | Zhang | G06F 3/0685 |
| 2021/0409440 | A1 * | 12/2021 | Barzilay | G06F 16/24 |
| 2022/0103429 | A1 * | 3/2022 | Vaidya | G06F 9/455 |
| 2022/0292221 | A1 * | 9/2022 | Sohail | H04L 63/105 |
| 2022/0329432 | A1 * | 10/2022 | Kawaguchi | H04L 9/3247 |
| 2024/0362243 | A1 * | 10/2024 | Huang | G06F 16/248 |

FOREIGN PATENT DOCUMENTS

| | | | |
|---|---|---|---|
| CN | 112860752 | A | 5/2021 |
| CN | 113094744 | A | 7/2021 |
| CN | 113868295 | A | 12/2021 |
| EP | 3627348 | A1 | 3/2020 |

* cited by examiner

DATA QUERY METHOD AND APPARATUS, AND SECURE MULTI-PARTY DATABASE

This specification is a U.S. National Stage Application of PCT Application Serial No. PCT/CN2022/104422, filed Jul. 7, 2022, which claims priority to Chinese Patent Application No. 202111126949.2, filed with the China National Intellectual Property Administration on Sep. 18, 2021 and entitled "DATA QUERY METHOD AND APPARATUS, AND SECURE MULTI-PARTY DATABASE", which is incorporated herein by reference in its entirety.

TECHNICAL FIELD

One or more embodiments of this specification relate to the computer field, and in particular, to a data query method and apparatus, and a secure multi-party database.

BACKGROUND

In some service scenarios, a database needs to be jointly constructed by using data of a plurality of organizations. Data of each organization may include or belong to private data. A secure multi-party database usually includes a plurality of databases and a central node configured to provide data query services to users. Data of different organizations is stored in different databases, and data in different databases is invisible to each other, that is, a database cannot directly access data in another database.

Therefore, it is desirable to have a new technical solution to make the secure multi-party database have better extensibility.

SUMMARY

One or more embodiments of this specification provide a data query method and apparatus, and a secure multi-party database, to improve extensibility of the secure multi-party database.

According to a first aspect, a secure multi-party database is provided, and includes a central node and a plurality of databases. The central node has a disclosed first interface. Each of a plurality of query engines corresponding to the plurality of databases includes a second interface that interacts with the first interface. The central node can determine a plurality of target databases related to a query request from the plurality of databases based on the query request; and send a query indication to a plurality of target query engines corresponding to the plurality of target databases through the first interface in the central node. The plurality of target query engines can receive the query indication from second interfaces, and execute the query indication to obtain a query result; and send the query result to the first interface in the central node through the second interfaces in the plurality of target query engines.

In a possible implementation, the plurality of databases belong to a plurality of groups; and databases that belong to a same group have a same privacy algorithm.

In a possible implementation, the databases that belong to the same group are provided by a same service provider.

In a possible implementation, the central node stores metadata used to indicate groups to which the plurality of databases respectively belong and to indicate data information stored in the plurality of databases.

In a possible implementation, the central node can receive a registration request from a current database, where the registration request indicates at least a group to which the current database belongs, and the registration request is sent by the current database through a second interface in the current database; and the central node updates the metadata based on the registration request.

In a possible implementation, the query request includes a query statement and a first group identifier of a first group; and the central node can determine, based on the first group identifier, several databases that belong to the first group, and determine the plurality of target databases from the several databases based on the query statement.

In a possible implementation, the first interface sends the query indication to the second interfaces in the target query engines by using a remote procedure call; and the second interfaces send the query result to the first interface in the central node by using a remote procedure call.

In a possible implementation, privacy algorithms that the plurality of target databases have include secure multi-party computation (Multi-Party Computation, MPC) methods respectively corresponding to several operation manners allowed by the plurality of target databases; and the query request relates to at least one of the several operation manners.

According to a second aspect, a data query method for a secure multi-party database is provided. The secure multi-party database includes a central node and a plurality of databases. The central node has a disclosed first interface. Each of a plurality of query engines corresponding to the plurality of databases includes a second interface that interacts with the first interface. The method includes: The central node determines a plurality of target databases related to a query request from the plurality of databases based on the query request; the central node sends a query indication to a plurality of target query engines corresponding to the plurality of target databases through the first interface in the central node; the plurality of target query engines receive the query indication through second interfaces in the plurality of target query engines, and execute the query indication to obtain a query result; and the plurality of target query engines send the query result to the first interface in the central node through the second interfaces in the plurality of target query engines.

In a possible implementation, the plurality of databases belong to a plurality of groups; and databases that belong to a same group have a same privacy algorithm.

In a possible implementation, the databases that belong to the same group are provided by a same service provider.

In a possible implementation, the central node stores metadata used to indicate groups to which the plurality of databases respectively belong and to indicate data information stored in the plurality of databases.

In a possible implementation, the method further includes: The central node receives a registration request from a current database, where the registration request indicates at least a group to which the current database belongs, and the registration request is sent by the current database through a second interface in the current database; and the central node updates the metadata based on the registration request.

In a possible implementation, the query request includes a query statement and a first group identifier of a first group; and that the central node determines a plurality of target databases related to a query request from the plurality of databases based on the query request specifically includes: The central node determines, based on the first group identifier, several databases that belong to the first group, and determines the plurality of target databases from the several databases based on the query statement.

In a possible implementation, the first interface sends the query indication to the second interfaces in the target query engines by using a remote procedure call; and the second interfaces send the query result to the first interface in the central node by using a remote procedure call.

In a possible implementation, privacy algorithms that the plurality of target databases have include secure multi-party computation MPC methods respectively corresponding to several operation manners allowed by the plurality of target databases; and the query request relates to at least one of the several operation manners.

According to a third aspect, a data query method for a secure multi-party database is provided. The secure multi-party database includes a central node and a plurality of databases. The central node has a disclosed first interface. Each of a plurality of query engines corresponding to the plurality of databases includes a second interface that interacts with the first interface. The method is applied to the central node. The method includes: determining a plurality of target databases related to a query request from the plurality of databases based on the query request; sending a query indication to a plurality of target query engines corresponding to the plurality of target databases through the first interface, so that the plurality of target query engines execute the query indication to obtain a query result; and receiving, through the first interface, the query result sent by the plurality of target query engines through second interfaces in the plurality of target query engines.

In a possible implementation, the query request includes a query statement and a first group identifier of a first group; and the determining a plurality of target databases related to a query request from the plurality of databases based on the query request specifically includes: determining, based on the first group identifier, several databases that belong to the first group, and determining the plurality of target databases from the several databases based on the query statement.

In a possible implementation, the method further includes: receiving a registration request from a current database, where the registration request indicates at least a group to which the current database belongs, and the registration request is sent by the current database through a second interface in the current database; and updating, based on the registration request, metadata stored in the central node.

According to a fourth aspect, a data query apparatus for a secure multi-party database is provided. The secure multi-party database includes a central node and a plurality of databases. The central node has a disclosed first interface. Each of a plurality of query engines corresponding to the plurality of databases includes a second interface that interacts with the first interface. The apparatus is applied to the central node. The apparatus further includes: a task processing unit, configured to determine a plurality of target databases related to a query request from the plurality of databases based on the query request; and the first interface, configured to send a query indication to a plurality of target query engines corresponding to the plurality of target databases, so that the plurality of target query engines execute the query indication to obtain a query result; and receive the query result sent by the plurality of target query engines through second interfaces in the plurality of target query engines.

In a possible implementation, the query request includes a query statement and a first group identifier of a first group; and the task processing unit is specifically configured to determine, based on the first group identifier, several databases that belong to the first group, and determine the plurality of target databases from the several databases based on the query statement.

In a possible implementation, the first interface is further configured to receive a registration request from a current database, where the registration request indicates at least a group to which the current database belongs, and the registration request is sent by the current database through a second interface in the current database; and the task processing unit is further configured to update, based on the registration request, metadata stored in the central node.

According to a fifth aspect, a computer-readable storage medium is provided. The computer-readable storage medium stores a computer program. When the computer program is executed in a computing device, the computing device performs the method according to any one of the third aspect.

According to a sixth aspect, a computing device is provided, and includes a memory and a processor. The memory stores a computer program. When the processor executes the computer program, the method according to any one of the third aspect is implemented.

According to the method and the apparatus provided in one or more embodiments of this specification, the first interface that is in the central node and that is configured to interact with a database is used as a public protocol layer and disclosed, and each service provider can provide, based on a service requirement of the service provider, a database using a specific privacy algorithm. For a single database, a service provider of the single database only needs to ensure that a second interface configured to interact with the first interface is disposed in a query engine corresponding to the database, and the database can join a secure multi-party database to which the central node belongs and communicate with the central node, so that the database receives a query indication corresponding to a query request related to the database from the central node, jointly executes the query indication with another database in the secure multi-party database by using a privacy algorithm used by the single database, to obtain a query result, and then returns the query result to the central node. That is, the secure multi-party database neither requires a single service provider to provide the central node and a plurality of databases, nor requires all databases in the secure multi-party database to use a same privacy algorithm, and does not need to fully disclose software code actually used by the central node and each database. This helps extend the existing secure multi-party database, that is, the secure multi-party database has better extensibility.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following description show merely some embodiments of this specification, and a person of ordinary skill in the art can derive other drawings from these accompanying drawings without creative efforts.

DESCRIPTION OF EMBODIMENTS

The non-limiting embodiments provided in this specification are described below in detail with reference to the accompanying drawings.

When a central node of a secure multi-party database receives a data query request initiated by a user, and the query request relates to a plurality of pieces of data stored in a plurality of databases, each database related to the query request can perform corresponding secure multi-party computation on the plurality of pieces of data, to obtain a query result, and return the query result to the user through the central node. It should be specifically noted that the secure multi-party database provides a data query service to the user through the central node, and the plurality of databases related to the query request need to perform secure multi-party computation, to obtain the corresponding query result. Therefore, it can be considered that the secure multi-party database logically forms a new virtual database.

If extensibility of the secure multi-party database is relatively good, applicability of the secure multi-party database is greatly improved.

Embodiments of this specification provide at least a secure multi-party database and a data query method and apparatus for a secure multi-party database. The secure multi-party database has better extensibility.

Figure 1:
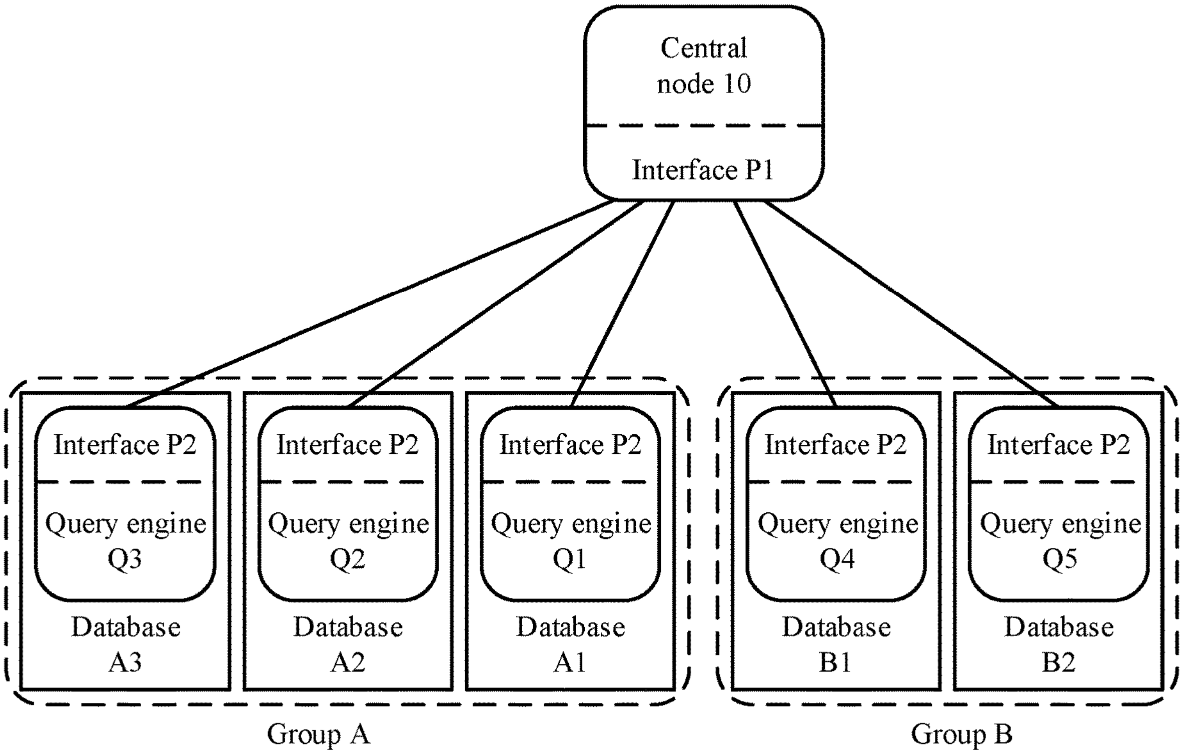
FIG. 1 is an architectural diagram of a secure multi-party database according to an example embodiment of this specification.

FIG. 1 is an architectural diagram of a secure multi-party database according to an example embodiment of this specification. As shown in FIG. 1, the secure multi-party database includes a central node 10 and a plurality of databases. The central node 10 has a disclosed first interface (namely, an interface P1). The first interface is configured to support the central node 10 in interacting with the plurality of databases. Each of a plurality of query engines corresponding to the plurality of databases includes a second interface (namely, an interface P2) configured to interact with the interface P1. For example, the plurality of databases include a database A1, a database A2, a database A3, a database B1, and a database B2, and each of a query engine Q1 to a query engine Q5 corresponding to the plurality of example databases includes an interface P2.

The interface P1 that is in the central node 10 and that is configured to interact with a database is used as a public protocol (Public Protocol) layer and disclosed, and each service provider can provide, based on a service requirement of the service provider, a database using a specific privacy algorithm. For a single database, a service provider of the single database only needs to ensure that an interface P2 configured to interact with the interface P1 is disposed in a query engine corresponding to the database, and the database can join a secure multi-party database to which the central node 10 belongs and communicate with the central node 10, so that the database receives a query indication corresponding to a query request related to the database from the central node 10, jointly executes the query indication with another database in the secure multi-party database by using a privacy algorithm used by the single database, to obtain a query result, and then returns the corresponding query result to the central node 10. That is, the secure multi-party database neither requires a single service provider to provide the central node and a plurality of databases, nor requires all databases in the secure multi-party database to use a same privacy algorithm, and does not need to fully disclose software code actually used by the central node and each database. This helps extend the secure multi-party database, that is, the secure multi-party database has better extensibility.

In a relatively specific example, the interface P1 can specifically communicate with the query engine corresponding to the database by using a remote procedure call. For example, the interface P1 can send a query indication to an interface P2 of a target query engine by using a remote procedure call. Similarly, the interface P2 can communicate with the central node 10 by using a remote procedure call. For example, the interface P2 can send a query result to the interface P1 of the central node by using a remote procedure call. More specifically, the remote procedure call depends on a session (session) established between the central node 10 and the query engine. A service provider of the database can deploy an interface function message start session used to establish a session, an interface function message run session dag used to activate a session, an interface function message end session used to end a session, and the like in the query engine corresponding to the database based on the disclosed interface P1, to form the interface P2 including the example interface functions, so that the interface P1 calls the interface function in the interface P2 based on an actual service requirement of the central node 10, and the interface P2 calls back the interface P1 based on a service requirement of the query engine to which the interface P2 belongs.

In a relatively specific example, different databases may have different privacy algorithms, and databases that have a same privacy algorithm can be grouped into a same group. For example, the example database A1, database A2, and database A3 have a same privacy algorithm, and can be grouped into a same group A; and the example database B1 and database B2 have a same privacy algorithm, and can be grouped into a same group B. A privacy algorithm that a single database has can specifically include MPC methods respectively corresponding to several operation manners allowed by the database. The several operation manners can include but are not limited to one or more of the following operation manners: a join operation, a comparison operation, an IN operation, and an aggregation operation. For example, the join operation is "inner join" or "cross join". For example, the comparison operation is "<", "≤", "=", "!=", "≥", or ">". For example, the aggregation operation is "MIN", "MAX", "SUM", or "AVG".

In privacy algorithms that any two databases belonging to different groups respectively have, a same operation manner may correspond to different MPC methods. For example, an operation manner allowed by a database in each of the group A and the group B includes the IN operation. When a plurality of target databases in the group A or a plurality of target databases in the group B respectively execute query indications received by the plurality of target databases, a query plan that actually needs to be jointly executed by the plurality of target databases may include a logical operation that belongs to the IN operation, and the plurality of target databases need to complete the logical operation by using a private set intersection (Private Set Intersection, PSI) technology. However, databases in the group A and the group B may use different PSI. Specifically, for example, the database in the group A may use simple hash-based PSI, and the database in the group B may use PSI based on DH in a finite field, PSI based on DH in an elliptic curve, or another form of PSI.

All databases in a single group can be specifically provided by a same service provider, to ensure that a plurality of databases in the single group use an exactly same privacy algorithm. Correspondingly, to distinguish between different groups, a group identifier of the single group can specifically include an identifier of a service provider that is used to provide the database in the group, for example, a name of the service provider. In addition, a single service provider may provide a plurality of databases using different privacy algorithms. For example, the databases in the group A and the group B may have a same service provider, but the database in the group A and the database in the group B use privacy algorithms different from each other. If databases using a same privacy algorithm correspond to a same version number, and databases using different privacy algorithms correspond to different version numbers, in addition to the identifier of the corresponding service provider, the group identifier of the single group can further include a version number corresponding to the database in the group.

The central node 10 can specifically process a query request from a data requester, to obtain a query plan, and send, through the interface P1, a query indication obtained based on the query plan to a plurality of target databases related to the query request. More specifically, the central node 10 can parse the query request, to obtain a query plan corresponding to a query statement in the query request. The query plan can include several to-be-performed logical operations and an execution sequence corresponding to the several logical operations. The query statement can be specifically implemented by using a structured query language (Structured Query Language, SQL), or may be implemented by using another language format supported by the secure multi-party database.

In a possible implementation, the central node 10 stores metadata of the secure multi-party database. The metadata is used to indicate at least groups to which the plurality of databases in the secure multi-party database respectively belong and data information stored in the plurality of databases. The data information is, for example, table names of several database tables respectively stored in the plurality of databases, content information of each database table, and security information of each database table. Content information of a single database table is, for example, a field name of each of several fields included in the database table. Security information of the single database table is, for example, operation manners respectively allowed by the several fields included in the database table. Correspondingly, when receiving the query request from the data requester, the central node 10 can determine the plurality of target databases related to the query request from the plurality of groups based on the metadata stored in the central node 10.

In a relatively specific example, the query request can include a group identifier of a group related to the query request. The central node 10 can determine, based on the group identifier, several databases that belong to the group related to the query request, for example, determine, based on the metadata stored in the central node 10 and the group identifier, several databases that belong to the group related to the query request; and then determine the plurality of target databases from the several databases based on the query statement, for example, determine the plurality of target databases from the several databases based on the metadata stored in the central node 10 and the query statement. For example, if a data table whose table name is ant1 and a data table whose table name is ant2 are stored in the database A1, a data table whose table name is isv1 and a data table whose table name is isv2 are stored in the database A2, a data table whose table name is special_item_list is stored in the database A3, a data table whose table name is L1 is stored in the database B1, and a data table whose table name is L2 is stored in the database B2, the metadata stored in the central node 10 can be, for example, a mapping relationship shown in Table 1.

TABLE 1

| Group | Database | Data table |
|---|---|---|
| A | A1 | ant1 and ant2 |
| | A2 | isv1 and isv2 |
| | A3 | special_item_list |
| B | B1 | L1 |
| | B2 | L2 |

It continues to be assumed that the query request specifically includes the following example query statement:

```
select
ant1.auto_id,
isv1.location as f1,
ant1.precondition_time ≤ isv1.item_time as f2,
isv1.item in (
    select
      special_item
    from
      special_item_list
  ) as f3,
from ant1 cross join isv1 where ant1.customer_id = "XXX" and
isv1.customer_id = "XXX".
```

For the example query statement, the central node 10 can perform syntax analysis on the query statement, to obtain the table names ant1, isv1, and special_item_list from the query statement, then determine, based on the mapping relationship shown as an example in Table 1 and the group identifier "A" in the query request, the database A1, the database A2, and the database A3 that belong to the group A, and further determine, based on the table names obtained by the central node 10, the database A1, the database A2, and the database A3 as the target databases related to the query request. In addition, it should be specifically noted that table names of the data tables shown as examples in Table 1 are different from each other. However, because data of different organizations is stored in different databases, data tables that have a same table name but do not have same data content may exist in the different databases. For example, the database B1 may also include a data table whose table name is ant1, but the data table and the data table whose table name is ant1 and that is stored in the database A1 may have completely different data content.

In another relatively specific example, the metadata stored in the central node 10 can further define a mapping table name corresponding to the table name of the data table in the query statement, that is, the foregoing data information can further include a mapping table name corresponding to the table name of the data table in the query statement. In this way, the group identifier of the group related to the query request does not need to be included in the query request. Instead, the central node 10 directly determines the plurality of target databases in the group related to the query request from the plurality of groups based on the query statement and the metadata stored in the central node 10. For example, for the table names ant1, isv1, and special_item_list, mapping table names L3, L4, and L5 sequentially corresponding to the table names ant1, isv1, and special_item_list can be defined based on Table 1, and the central node 10 can disclose the mapping table names but does not disclose the table names of the data tables stored in the databases. In this case, the query statement includes the mapping table names L3, L4, and L5, but does not include the table names ant1, isv1, and special_item_list. The central node 10 can determine the database A1, the database A2, and the database A3 that store data tables whose table names are sequentially ant1, isv1, and special_item_list as the target databases based on a mapping relationship between L3 and ant1, a mapping relationship between L4 and isv1, and a mapping relationship between L5 and special_item_list that are defined in the metadata.

For the metadata stored in the central node 10, when a new database requests to join the secure multi-party database or a new data table needs to be added to or a data table needs to be deleted from a database in the secure multi-party database, the central node 10 can update the metadata. In a relatively specific example, when a new database C1 requests to join the secure multi-party database, the central node 10 can receive a registration request from the database C1. The registration request indicates at least a group to which the database C1 belongs. For example, the registration request includes a group identifier of the group to which the database C1 belongs or indicates a privacy algorithm that the database C1 has. A corresponding interface P2 is deployed in a query engine corresponding to the database C1 based on the disclosed interface P1 in the central node 10, and the registration request is sent by the database C1 through the interface P2 in the query engine corresponding to the database C1. Correspondingly, the central node 10 can update, based on the registration request from the database C1, the metadata stored in the central node 10, for example, add a mapping relationship between an identifier of the database C1 and the group identifier of the group to which the database C1 belongs to the metadata.

Figure 2:
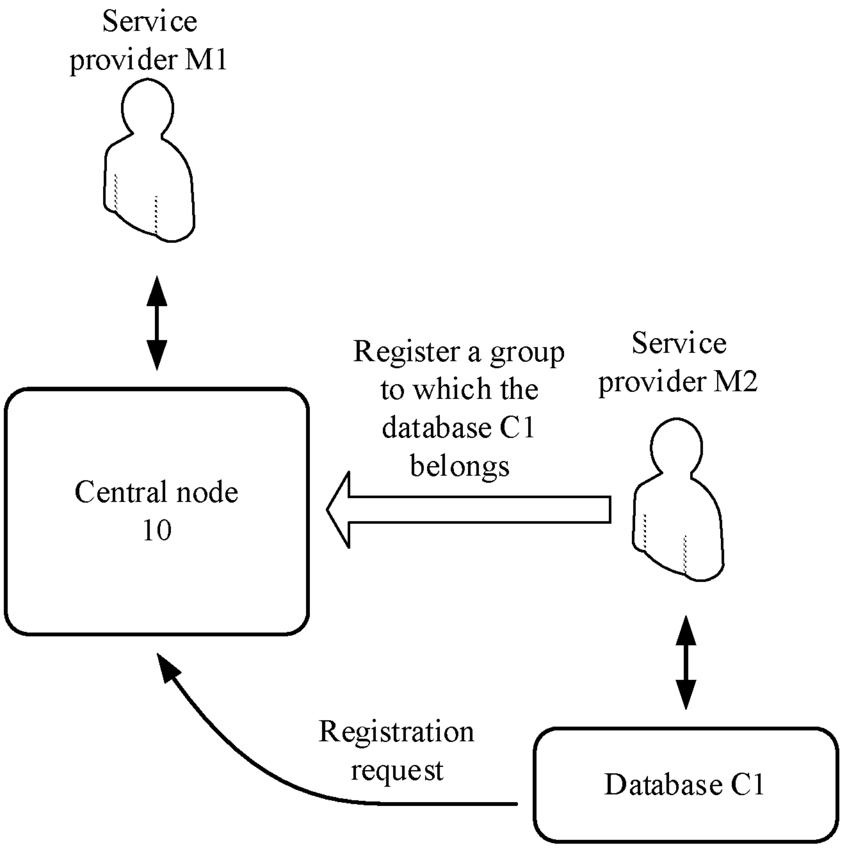
FIG. 2 is a schematic diagram of adding a new database to a secure multi-party database according to an embodiment of this specification.

Before adding, to the secure multi-party database, a database provided by a service provider, the service provider can further register a corresponding group with the central node 10 in advance. For example, with reference to FIG. 2, a service provider of the central node 10 is a service provider M1, a service provider M2 expects to add the database C1 using a privacy algorithm to the secure multi-party database, and the service provider M2 does not add another database using the privacy algorithm to the secure multi-party database before providing the database C1. In this case, the service provider M2 can register, with the central node 10 by using any possible implementation, for example, an implementation in which negotiation with the service provider M1 is performed and the service provider M1 configures the central node 10 or an implementation in which the service provider M2 calls another interface disclosed by the central node 10, the group to which the database C1 belongs, specifically, for example, register, with the central node 10, the group identifier of the group to which the database C1 belongs or the privacy algorithm used by the database C1. Correspondingly, when the registration request from the database C1 is received, only after it is determined, based on the registration request, that the group to which the database C1 belongs is registered with the central node 10, the central node 10 can update, based on the registration request from the database C1, the metadata stored in the central node 10, to add the database C1 to the secure multi-party database.

The query indication is obtained based on a query plan corresponding to the query request, and is an indication message used to indicate the plurality of target databases to jointly execute the query plan. More specifically, the query indication can be a single message that includes the query plan and that is sent to the plurality of target databases. Alternatively, the query indication can be a plurality of messages that are obtained after task decomposition is performed on the query plan based on a predetermined rule, that correspond to the plurality of target databases, and that are different from each other, and the plurality of messages are correspondingly sent to the plurality of target databases.

The query result depends on a process in which a plurality of target query engines execute the query indication, that is, depends on a process in which the plurality of target query engines jointly execute the query plan. The query result may be specifically obtained by one of the plurality of target query engines. The target query engine that obtains the query result can send the query result to the central node 10 through an interface P2 disposed in the target query engine, so that the central node 10 returns the query result to the data requester that sends the query request. Alternatively, the plurality of target query engines may separately obtain different query results. The plurality of target query engines separately send the query results to the central node 10 through interfaces P2 in the plurality of target query engines. The central node 10 combines the query results from the plurality of target query engines, and returns a query result obtained after the combination to the data requester that sends the query request.

It should be specifically noted that although the secure multi-party database provided in the embodiments of this specification is described above by using an example and with reference to FIG. 1, it can be understood that the secure multi-party database shown as an example in FIG. 1 is merely used to assist in describing the technical solutions provided in the embodiments of this specification, and it is clear that a secure multi-party database in an actual service scenario can include more or fewer groups, and a single group can include more or fewer databases.

Figure 3:
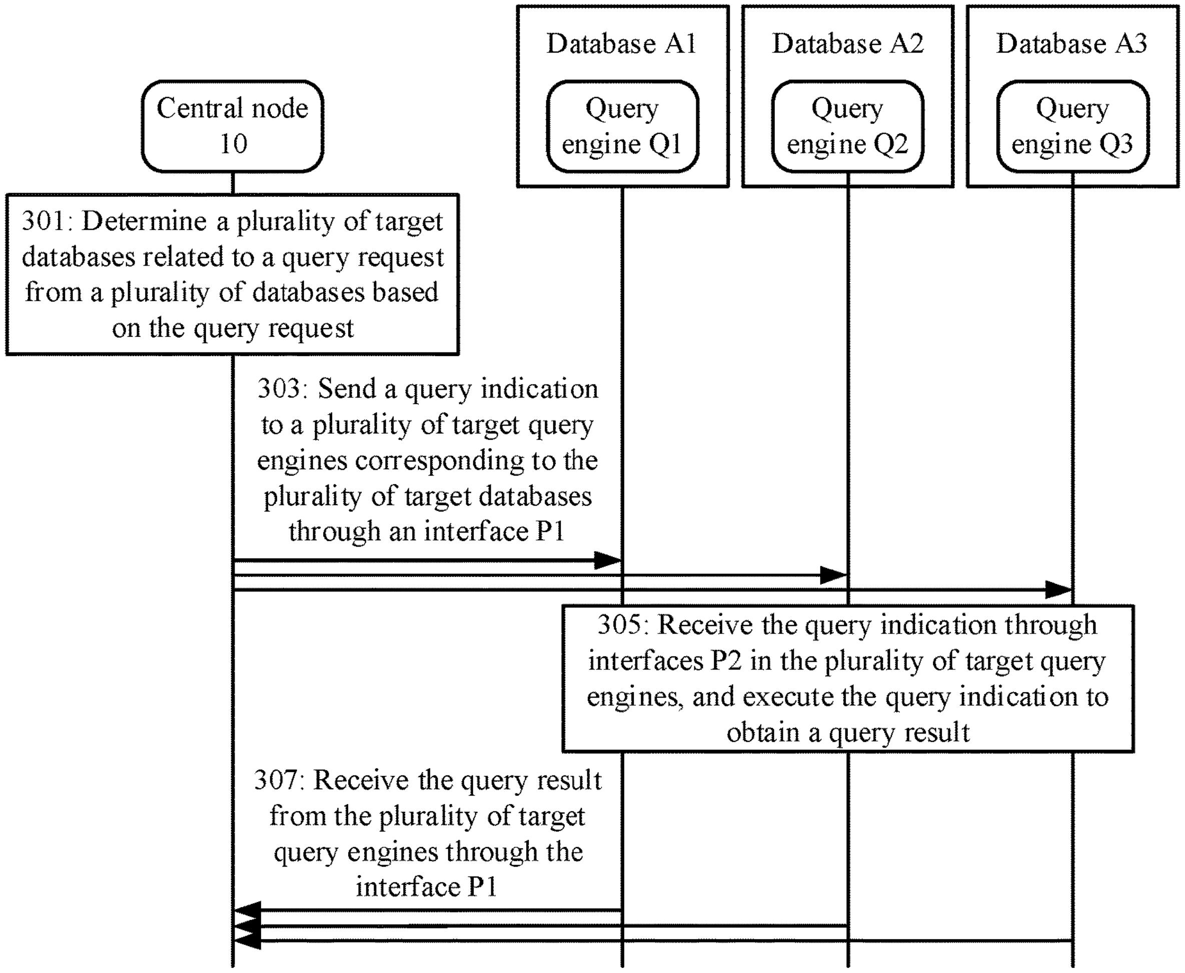
FIG. 3 is a schematic diagram of a data query method for a secure multi-party database according to an embodiment of this specification.

Based on a same concept as the foregoing method embodiment, an embodiment of this specification further provides a data query method for a secure multi-party database. The secure multi-party database includes a central node and a plurality of databases. The central node has a disclosed interface P1. Each of a plurality of query engines corresponding to the plurality of databases includes an interface P2 that interacts with the interface P1. As shown in FIG. 3, the method can include some or all of the following steps 301 to 307. For example, a data query method performed by the central node can include step 301, step 303, and step 307 in the following steps.

First, in step 301, the central node 10 determines a plurality of target databases related to a query request from the plurality of databases based on the query request. In FIG. 3, for example, the plurality of target databases are shown as a database A1, a database A2, and a database A3 that belong to a group A.

Then, in step 303, the central node 10 sends a query indication to a plurality of target query engines corresponding to the plurality of target databases through the interface P1 in the central node 10.

Then, in step 305, the plurality of target query engines receive the query indication through interfaces P2 in the plurality of target query engines, and execute the query indication to obtain a query result.

Finally, in step 307, the central node 10 receives the query result from the plurality of target query engines through the interface P1 in the central node 10. The query result is sent by the plurality of target query engines through the interfaces P2 in the plurality of target query engines.

Figure 4:
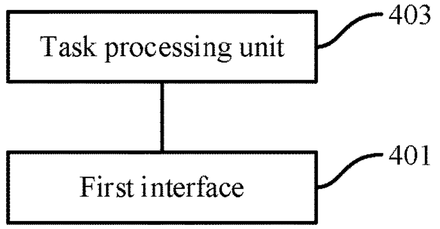
FIG. 4 is a schematic diagram of a data query apparatus for a secure multi-party database according to an embodiment of this specification.

Based on a same concept as the foregoing embodiments, an embodiment of this specification further provides a data query apparatus for a secure multi-party database. The secure multi-party database includes a central node 10 and a plurality of databases. The central node 10 has a disclosed first interface 401. Each of a plurality of query engines corresponding to the plurality of databases includes a second interface that interacts with the first interface 401. The apparatus is deployed in the central node 10. As shown in FIG. 4, the apparatus further includes: a task processing unit 403, configured to determine a plurality of target databases related to a query request from the plurality of databases based on the query request; and the first interface 401, configured to send a query indication to a plurality of target query engines corresponding to the plurality of target databases, so that the plurality of target query engines receive the query indication through second interfaces in the plurality of target query engines, and execute the query indication to obtain a query result; and receive the query result sent by the plurality of target query engines through the second interfaces in the plurality of target query engines.

In a possible implementation, the query request includes a query statement and a first group identifier of a first group; and the task processing unit 403 is specifically configured to determine, based on the first group identifier, several databases that belong to the first group, and determine the plurality of target databases from the several databases based on the query statement.

In a possible implementation, the first interface 401 is further configured to receive a registration request from a current database, where the registration request indicates at least a group to which the current database belongs, and the registration request is sent by the current database through a second interface in the current database; and the task processing unit 403 is further configured to update, based on the registration request, metadata stored in the central node.

A person skilled in the art should be aware that in the foregoing one or more examples, the functions described in this specification can be implemented by hardware, software, firmware, or any combination thereof. When software is used for implementation, a computer program corresponding to these functions can be stored in a computer-readable medium or transmitted as one or more instructions/codes on a computer-readable medium, so that when the computer program corresponding to these functions is executed by a computer, the method according to any one of the embodiments of this specification is implemented by the computer.

An embodiment of this specification further provides a computer-readable storage medium. The computer-readable storage medium stores a computer program/instructions. When the computer program/instructions is/are executed in a computing device, the computing device performs the method performed by the central node 10 in any one of the embodiments of this specification.

An embodiment of this specification further provides a computing device, including a memory and a processor. The memory stores a computer program/instructions. When the processor executes the computer program/instructions, the method performed by the central node 10 in any one of the embodiments of this specification is implemented.

The embodiments of this specification are described in a progressive way. For same or similar parts of the embodiments, mutual references can be made to the embodiments. Each embodiment focuses on a difference from other embodiments. Therefore, some embodiments may be briefly described. For related parts, references can be made to some descriptions in other embodiments.

Specific embodiments of this specification are described above. Other embodiments fall within the scope of the appended claims. In some cases, actions or steps described in the claims can be performed in a sequence different from that in the embodiments and desired results can still be achieved. In addition, the process depicted in the accompanying drawings does not necessarily need a particular sequence to achieve the desired results. In some implementations, multi-tasking and parallel processing are feasible or may be advantageous.

It should be understood that the foregoing descriptions are merely specific implementations of this specification and are not intended to limit the protection scope of this specification. Any modifications, equivalent replacements, improvements, and the like made based on the technical solutions of this specification shall fall within the protection scope of this specification.

What is claimed is:

1. A system of computing devices comprising a secure multi-party database including a central node and a plurality of databases, wherein the plurality of databases are grouped into a plurality of groups based on respective privacy algorithms of the plurality of the databases, such that databases of the plurality of databases that belong to a same group have a same privacy algorithm and databases of the plurality of databases that belong to different groups have different privacy algorithms, the central node has a disclosed first interface, and each of a plurality of query engines corresponding to the plurality of databases comprises a second interface that interacts with the first interface;

the central node configured to determine a plurality of target databases related to a query request from the plurality of databases based on the query request; and send a query indication to a plurality of target query engines corresponding to the plurality of target databases through the first interface in the central node; and the plurality of target query engines configured to receive the query indication from second interfaces, and execute the query indication to obtain a query result; and send the query result to the first interface in the central node through the second interfaces in the plurality of target query engines;

wherein each of the privacy algorithms comprises a secure multi-party computation (MPC) method that prevents disclosure of raw data of the respective database to other databases during execution of the query indication.

2. The system according to claim 1, wherein the databases that belong to the same group are provided by a same service provider.

3. The system according to claim 1, wherein the central node stores metadata used to indicate groups to which the plurality of databases respectively belong and to indicate data information stored in the plurality of databases.

4. The system according to claim 3, wherein the central node is configured to receive a registration request from a current database, wherein the registration request indicates at least a group to which the current database belongs, and the registration request is sent by the current database through a second interface corresponding to the current database; and the central node updates the metadata based on the registration request.

5. The system according to claim 1, wherein the query request comprises a query statement and a first group identifier of a first group; and the central node configured to determine, based on the first group identifier, several databases that belong to the first group, and determine the plurality of target databases from the several databases based on the query statement.

6. The system according to claim 1, wherein the first interface sends the query indication to the second interfaces in the target query engines by using a remote procedure call; and the second interfaces send the query result to the first interface in the central node by using a remote procedure call.

7. The system according to claim 1, wherein the query request relates to at least one of the several operation manners.

8. A data query method for a secure multi-party database, wherein the secure multi-party database comprises a central node and a plurality of databases, the plurality of databases are grouped into to a plurality of groups based on respective privacy algorithms of the plurality of the databases, such that databases of the plurality of databases that belong to a same group have a same privacy algorithm and databases of the plurality of databases that belong to different groups have different privacy algorithms, the central node has a disclosed first interface, each of a plurality of query engines corresponding to the plurality of databases comprises a second interface that interacts with the first interface, and the method comprises:

- determining, by the central node, a plurality of target databases related to a query request from the plurality of databases based on the query request;
- sending, by the central node, a query indication to a plurality of target query engines corresponding to the plurality of target databases through the first interface in the central node;
- receiving, by the plurality of target query engines, the query indication through second interfaces in the plurality of target query engines, and executing the query indication to obtain a query result, wherein each of the privacy algorithms comprises a secure multi-party computation (MPC) method that prevents disclosure of raw data of the respective database to other databases during execution of the query indication; and
- sending, by the plurality of target query engines, the query result to the first interface in the central node through the second interfaces in the plurality of target query engines.

9. The method according to claim 8, wherein the databases that belong to the same group are provided by a same service provider.

10. The method according to claim 8, wherein the central node stores metadata used to indicate groups to which the plurality of databases respectively belong and to indicate data information stored in the plurality of databases.

11. The method according to claim 10, further comprising:

- receiving, by the central node, a registration request from a current database, wherein the registration request indicates at least a group to which the current database belongs, and the registration request is sent by the current database through a second interface in the current database; and
- updating, by the central node, the metadata based on the registration request.

12. The method according to claim 8, wherein the query request comprises a query statement and a first group identifier of a first group; and the determining, by the central node, a plurality of target databases related to a query request from the plurality of databases based on the query request specifically comprises: determining, by the central node based on the first group identifier, several databases that belong to the first group, and determining the plurality of target databases from the several databases based on the query statement.

13. The method according to claim 8, wherein the first interface sends the query indication to the second interfaces in the target query engines by using a remote procedure call; and the second interfaces send the query result to the first interface in the central node by using a remote procedure call.

14. The method according to claim 8, wherein the query request relates to at least one of the several operation manners.

15. A data query method for a secure multi-party database, wherein the secure multi-party database comprises a central node and a plurality of databases, the plurality of databases are grouped into a plurality of groups based on respective privacy algorithms of the plurality of the databases, such that databases of the plurality of databases that belong to a same group have a same privacy algorithm and databases of the plurality of databases that belong to different groups have different privacy algorithms, the central node has a disclosed first interface, each of a plurality of query engines corresponding to the plurality of databases comprises a second interface that interacts with the first interface, and the method is applied to the central node and comprises:

- determining a plurality of target databases related to a query request from the plurality of databases based on the query request;
- sending a query indication to a plurality of target query engines corresponding to the plurality of target databases through the first interface, so that the plurality of target query engines execute the query indication to obtain a query result, wherein each of the privacy algorithms comprises a secure multi-party computation (MPC) method that prevents disclosure of raw data of the respective database to other databases during execution of the query indication; and
- receiving, through the first interface, the query result sent by the plurality of target query engines through second interfaces in the plurality of target query engines.

16. The method according to claim 15, wherein the query request comprises a query statement and a first group identifier of a first group; and the determining a plurality of target databases related to a query request from the plurality of databases based on the query request specifically comprises: determining, based on the first group identifier, several databases that belong to the first group, and determining the plurality of target databases from the several databases based on the query statement.

17. The method according to claim 15, further comprising:

- receiving a registration request from a current database, wherein the registration request indicates at least a group to which the current database belongs, and the registration request is sent by the current database through a second interface in the current database; and
- updating, based on the registration request, metadata stored in the central node.

18. A computing device, comprising a memory and a processor, wherein the memory stores executable instructions that, in response to execution by the processor, cause the processor to implement a data query method for a secure multi-party database, wherein the secure multi-party database comprises a central node and a plurality of databases, the plurality of databases are grouped into a plurality of groups based on respective privacy algorithms of the plurality of the databases, such that databases of the plurality of databases that belong to a same group have a same privacy algorithm and databases of the plurality of databases that belong to different groups have different privacy algorithms, the central node has a disclosed first interface, each of a plurality of query engines corresponding to the plurality of databases comprises a second interface that interacts with the first interface, and the method comprises:

determining a plurality of target databases related to a query request from the plurality of databases based on the query request;

sending a query indication to a plurality of target query engines corresponding to the plurality of target databases through the first interface, so that the plurality of target query engines execute the query indication to obtain a query result, wherein each of the privacy algorithms comprises a secure multi-party computation (MPC) method that prevents disclosure of raw data of the respective database to other databases during execution of the query indication; and receiving, through the first interface, the query result sent by the plurality of target query engines through second interfaces in the plurality of target query engines.

* * * * *